July 6, 1948.         L. D. HAGENBOOK           2,444,600
        SELF-LOADING DEVICE FOR SHAKER CONVEYERS
Filed Aug. 23, 1946                     4 Sheets-Sheet 1

July 6, 1948.     L. D. HAGENBOOK     2,444,600
SELF-LOADING DEVICE FOR SHAKER CONVEYERS
Filed Aug. 23, 1946      4 Sheets-Sheet 3

INVENTOR
Loy D. Hagenbook
Clarence F. Poole
Attorney

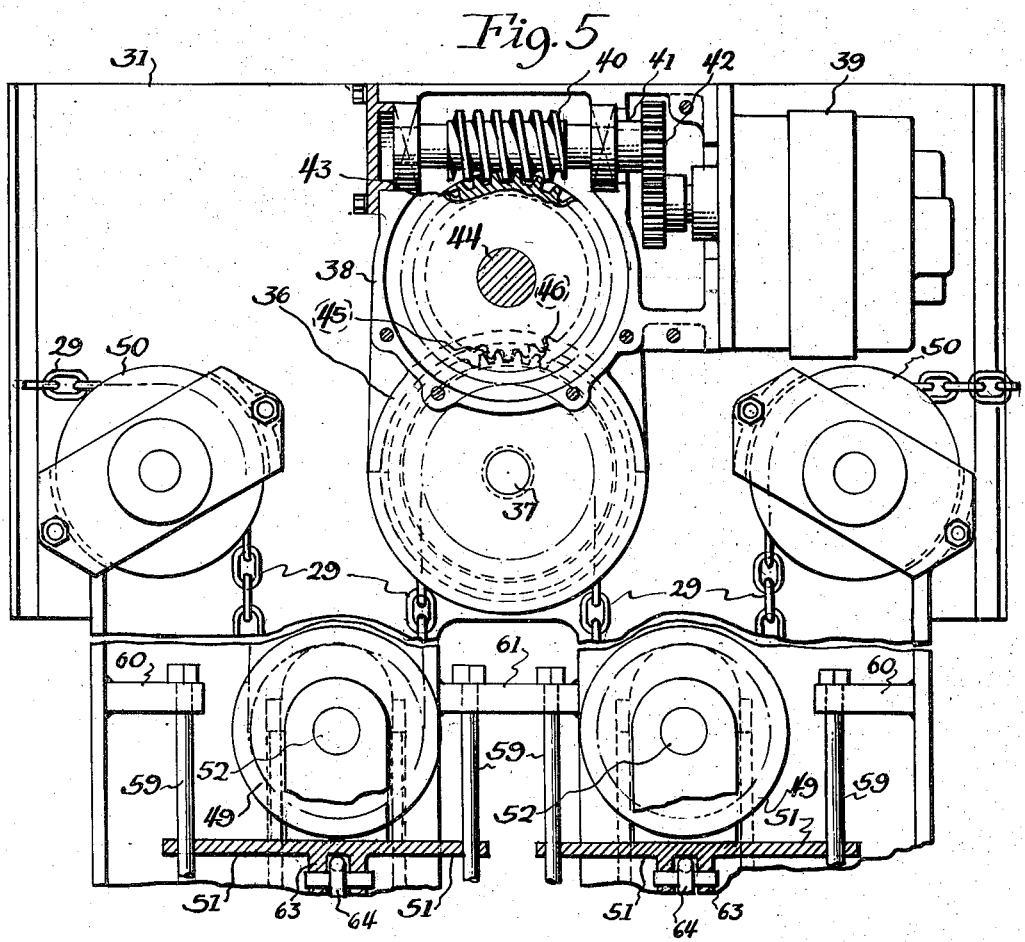

Patented July 6, 1948

2,444,600

UNITED STATES PATENT OFFICE 2,444,600

SELF-LOADING DEVICE FOR SHAKER CONVEYERS

Loy D. Hagenbook, Chicago, Ill., assignor to Goodman Manufacturing Company, Chicago, Ill., a corporation of Illinois Application August 23, 1946, Serial No. 692,546

8 Claims. (Cl. 198—14)

This invention relates to improvements in self-loading devices for shaker conveyors of the type utilized for picking up coal, rock, or the like from the ground in mines, and has as its principal objects to provide a novel and compact form of draft device mounted beneath the extensible trough of a shaker conveyor trough line, for moving said trough laterally about a swivel in the trough line, and including a single flexible draft member adapted to be secured at its ends at points spaced laterally from opposite sides of said trough, together with an improved form of compensating means for taking care of angular movement of said trough with respect to said draft member.

This and other objects of my invention will appear from time to time as the following specification proceeds and with reference to the accompanying drawings wherein:

Figure 5 is an enlarged fragmentary plan view of the draft device, with certain parts broken away and certain other parts shown in substantially horizontal section.

Figure 1:
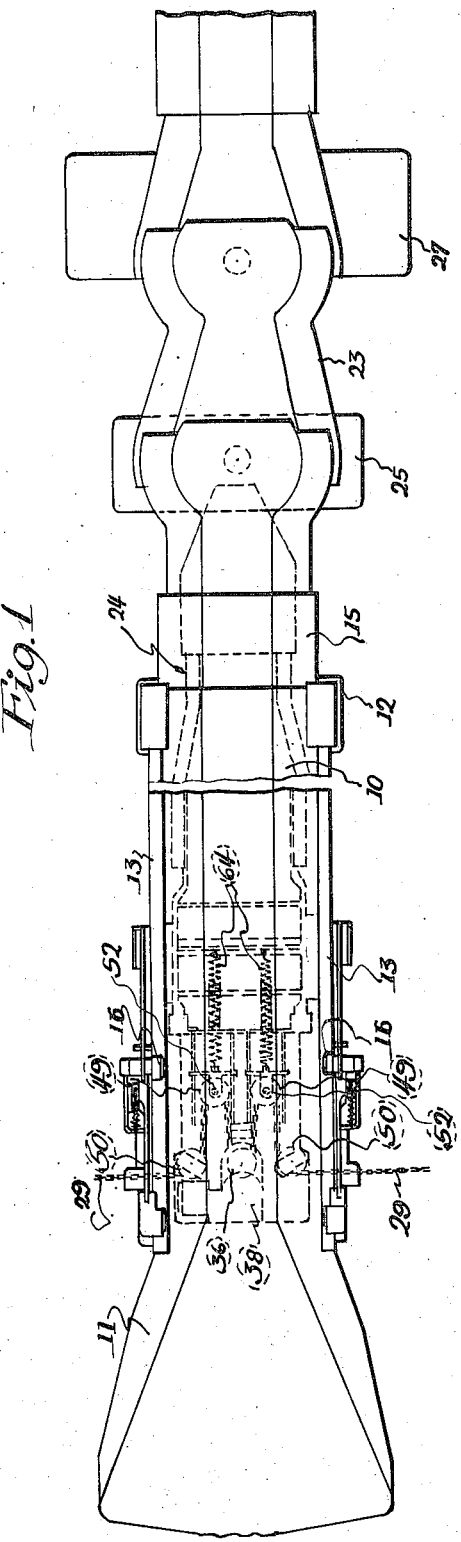
Figure 1 is a top plan view of a loading device constructed in accordance with my invention.
Figure 2:
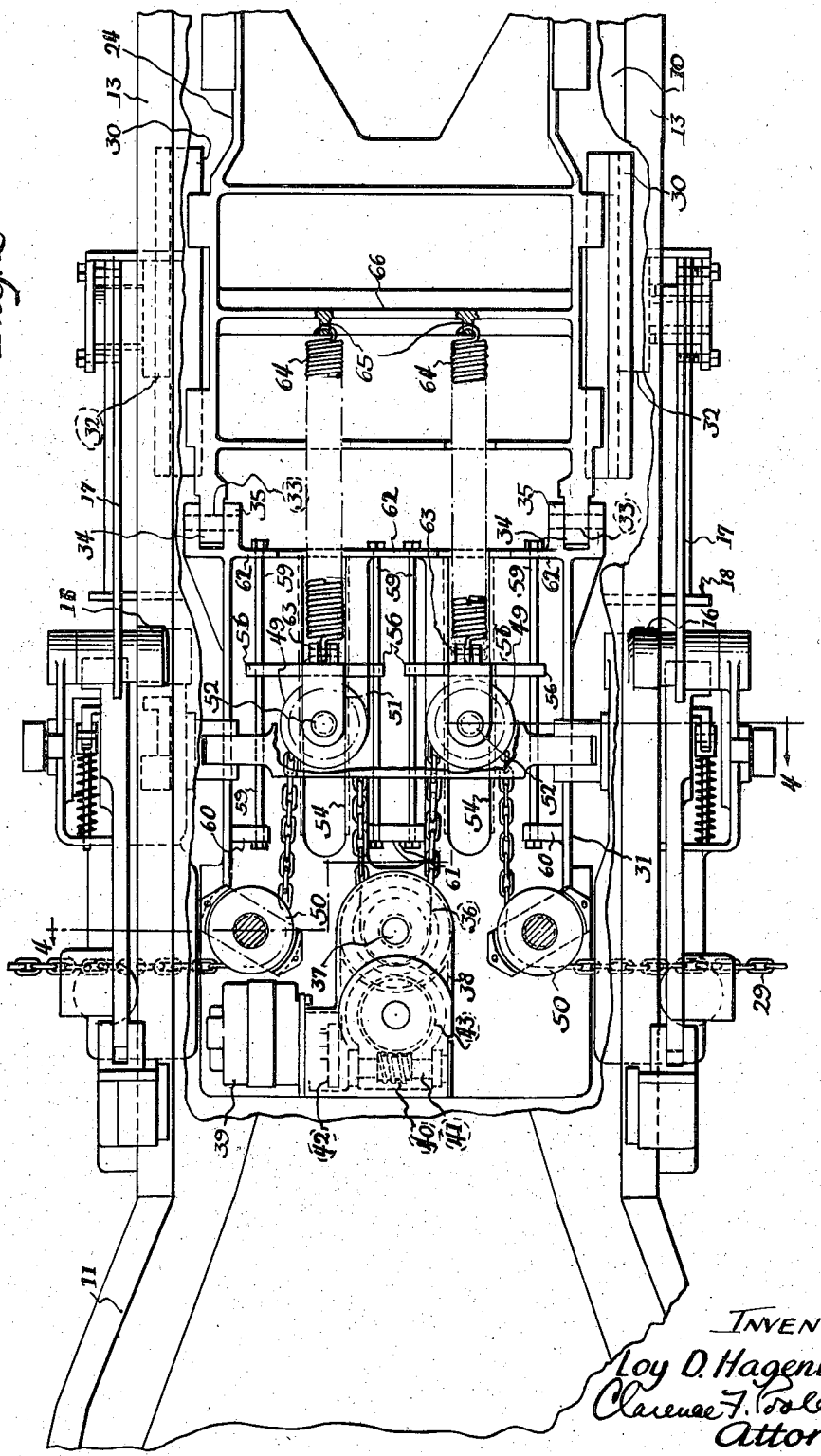
Figure 2 is an enlarged plan view of the forward end of the loading device, with certain parts of the extensible and reciprocating troughs broken away and certain parts of the draft device shown in horizontal section.
Figure 3:
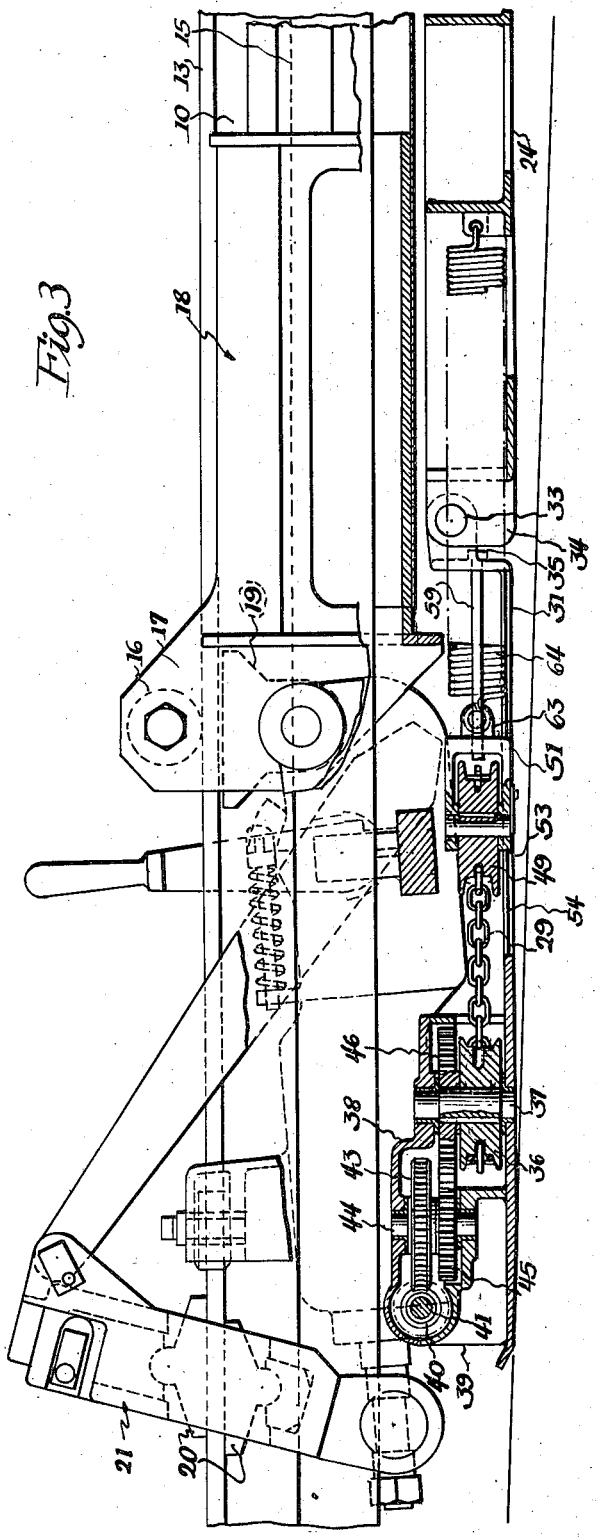
Figure 3 is an enlarged fragmentary view in side elevation of the loading device, with certain parts broken away and certain other parts shown in substantially longitudinal section.

The embodiment of my invention illustrated in the drawings includes generally an extensible trough 10 having a pick-up member or shovel 11 on its forward end, which serves to slidably support the forward end of said extensible trough on the ground. A rear end of said extensible trough is supported above the ground on a ground-engaging shoe 12 in a well known manner and no part of my present invention, and so, not herein shown or described in detail.

The extensible trough 10 has two bearing plates 13, 13 which extend along its upper outer edges and form a supporting means for the forward end of a reciprocating trough 15 on rollers 16, 16, mounted on opposite upright sides 17, 17 of a supporting frame 18. Bearing shoes 19, 19 mounted on said upright sides of said supporting frame are adapted to engage the under surfaces of said bearing plates to prevent vertical displacement of said troughs with respect to each other.

The bearing plates 13, 13 are also adapted to be engaged by friction grip blocks 20, 20 of a friction grip feeding device 21 during alternate strokes of the conveyor, for extensibly or retractibly moving the extensible trough 10 with respect to the reciprocating trough 15, or for reciprocably moving said extensible and reciprocating troughs together. Said friction grip feeding device may be of a type shown and described in an application Serial No. 670,490, filed by William W. Sloane on May 17, 1946, now Patent No. 2,434,127, issued January 6, 1948, and is no part of my present invention so need not herein be shown or described in detail.

The reciprocating trough 15 is connected to and is reciprocably driven from the shaker conveyor trough line through an articulated trough connection or swivel 23. Said swivel is so arranged as to form a means for controlling lateral movement of said reciprocating and said extensible troughs, and to permit the continuous flow of material along said reciprocating trough and swivel to the outby end of the trough line. Said swivel may be of any well known form and is no part of my present invention except in so far as it connects the reciprocating trough with the conveyor trough line and forms a pivotal reaction member for said reciprocating and extensible troughs, so need not herein be shown or described further.

An elongated supporting and guide frame 24 is connected at its rear end to a laterally movable shoe 25 of the swivel 23 for movement therewith about a stationary base 27 of said swivel. Said supporting and guide frame extends beneath the reciprocating trough 15 to a point beyond the forward end thereof and is held from reciprocation during operation of the conveyor by the shoe 25 and base 27. Said frame forms a non-reciprocating reaction and guide means for the extensible and reciprocating troughs 10 and 15, for laterally moving said troughs with respect to the stationary base 27 along a flexible draft member or chain 29 upon lateral movement of said frame along said draft member.

The frame 24 has the forward end of the reciprocating trough 15 slidably supported thereon on two laterally spaced longitudinally extending guide tracks 30, 30. Said guide tracks are mounted on and extend along opposite outer sides of the forward portion of said frame and forwardly beyond the forward end of said frame along opposite sides of a floating frame 31, which forms a ground-engaging forward extension of said frame 24. Said guide tracks have recessed engaging surfaces, which are adapted to be engaged by corresponding projecting surfaces of bearing members 32, 32 transversely pivoted to opposite side walls 17, 17 of the frame 18 and extending inwardly therefrom.

The floating frame 31 is pivotally connected to the forward end of the non-reciprocating frame 24 on transversely extending pivotal pins 33, 33. Said floating frame has floating engagement with the ground at its forward end and forms a support means for the draft means for moving the extensible and reciprocating troughs 10 and 15 laterally along the chain 29. Said pivotal pins extend through laterally spaced lugs 34, 34 projecting forwardly from the forward end of said non-reciprocating frame and through lugs 35, 35 projecting rearwardly from opposite sides of said floating frame and extending along opposite sides of said lugs 34, 34.

The means for moving the extensible and reciprocating troughs along the chain 29 and for holding said troughs in various fixed positions along said chain, includes a sprocket wheel 36 keyed on a vertical shaft 37 disposed adjacent the forward portion of said floating frame, and herein shown as being located at the longitudinal center of said frame. Said shaft is journaled at its lower end in the base plate of said floating frame and is journaled at its upper end in a top cover portion of a housing and bearing support 38 for the reduction gearing, for driving said sprocket wheel from a motor 39. Said motor is herein shown as being a reversible compactly arranged fluid motor of a low vertical height, so it may readily fit beneath said extensible trough without increasing the vertical height of the loading device, but may be a reversible electric motor or any other type of compactly arranged reversible motor.

The drive from the motor 39 to the sprocket 36 includes a worm 40 on a transverse shaft 41. Said shaft is driven from said motor through a spur gear reduction indicated generally by reference character 42 (see Figure 5). Said worm meshes with and drives a worm gear 43 keyed on a vertical shaft 44, which is journaled adjacent its upper and lower ends in the housing and bearing support 38. Said worm and gear are of a self-locking type so as to hold the shovel 11 in any desired position when the motor 39 is stopped. Said motor may also be hydraulically locked from rotation if desired. A spur gear 45 is keyed on said shaft beneath said worm gear and meshes with and drives a spur gear 46 keyed on the vertical shaft 37, above the sprocket wheel 36.

The chain 29 is trained around the forward end of and rearwardly along and beyond opposite sides of the sprocket wheel 36, to and around laterally spaced tension idlers 49, 49. Said tension idlers serve to hold said chain in engagement with said sprocket wheel and maintain tension thereon, and are disposed rearwardly of and on each side of said sprocket wheel and are guided in the floating frame 31 for movement longitudinally therealong, as will hereinafter more clearly appear as this specification proceeds. From said tension idlers said chain is trained in a forward direction to and around guide idlers 50, 50 at opposite sides of said floating frame. Said chain is trained laterally from said guide idlers from opposite sides of the machine, and its free ends are adapted to be held in fixed relation with respect to the ground as by jacks or the like (not shown), interposed between the mine roof and ground, so that upon operation of the motor 39 in one direction or another, said extensible trough and shovel will move laterally along said chain about the swivel 23 in the desired direction, to position the shovel 11 to pick up loose material from various positions along the entire working face.

Figure 4:
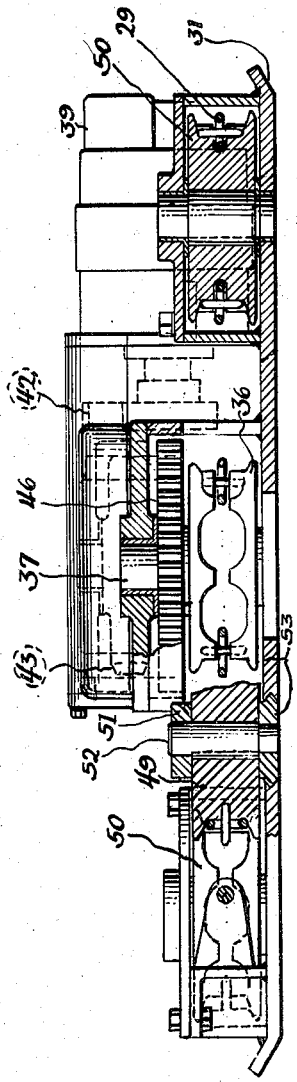
Figure 4 is a fragmentary transverse sectional view taken substantially along line 4—4 of Figure 2.

Each tension idler 49 is mounted on a vertical shaft 52, which is mounted at its opposite ends in a clevis-like member 51, extending along the upper and lower sides of said tension idler. A lower side 53 of said clevis-like member has outwardly projecting V-shaped sides which are guided in corresponding recessed portions of a guide 54, which is formed in the bottom plate of the floating frame 31 and extends longitudinally therealong (see Figure 4).

The closed rear portion of each clevis-like member 51 has ears 56, 56 projecting laterally from opposite sides thereof. Said ears are slidably guided on parallel spaced rods 59, 59, which extend longitudinally of said base plate. Said rods are secured at their forward ends to laterally spaced lugs 60 and 61 projecting upwardly from said base plate, and are secured at their rearward ends to a rib 62, which extends across the rear end of said base plate of said floating frame.

A pair of spaced ears 63 extend rearwardly from the closed portion of each clevis-like member 51 and have the end of a tension spring 64 extending therebetween and suitably connected thereto. The opposite end of each of said tension springs is connected to an ear 65, extending forwardly from a transverse rib 66 of the supporting and guide frame 24.

The tension springs 64, 64 are always under tension in all positions of the tension idlers 49, 49 along the guides 54, 54, so that when the chain 29 is trained around said tension idlers and is secured at its ends at points spaced laterally from the frame 24, with the slack taken out of said chain on both sides of said sprocket, said springs will maintain tension on the slack side of said chain and will hold said chain in driving engagement with the sprocket wheel 36. During travel of said frame along said chains, said springs may yield independently of each other so one spring may exert a pull on its associated tension idler and maintain tension on the slack side of said chain, while the other spring may yield to compensate for angularity in movement of the extensible trough 10 about the swivel 23, with respect to said endless chain, to cause the tension of said chain to be substantially constant at various positions of said extensible trough therealong.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyor, an extensible trough having a pick-up member on its forward end, means for laterally feeding said extensible trough and pick-up member including a flexible feeding member adapted to extend laterally from opposite sides of said extensible trough and to be held from movement with respect to the ground at its ends, a power driven wheel for moving said extensible trough along said flexible feeding member, and means engaging said flexible feeding member for holding said flexible feeding member in engagement with said wheel and maintaining tension on the slack side of said flexible feeding member during movement of said trough therealong including a guide idler spaced to one side of said wheel and having said flexible feeding member trained laterally therefrom, a tension idler disposed between said wheel and said guide idler and having the bight of said flexible feeding member trained therearound, and a yieldable member for moving said tension idler in a direction to maintain said flexible feeding member in engagement with said wheel and maintain tension on the slack side thereof.

2. In a shaker conveyor, an extensible trough having a pick-up member on its forward end, means for laterally feeding said extensible trough and pick-up member including a flexible feeding member adapted to extend laterally from opposite sides of said extensible trough and to be held from movement with respect to the ground at its ends, a power driven wheel for moving said extensible trough along said flexible feeding member, and means yieldably engaging said flexible feeding member for holding said flexible feeding member in engagement with said wheel and for maintaining tension on the slack side thereof during movement of said trough therealong including a guide idler spaced to one side of said wheel and having said flexible feeding member trained laterally therefrom, a tension idler disposed between said wheel and said guide idler and having the bight of said flexible feeding member trained therearound, means for guiding said tension idler for movement towards and from said wheel, and a spring for moving said tension idler along said guide means in a direction to maintain a predetermined tension on the slack side of said flexible feeding member.

3. In a shaker conveyor, an extensible trough having a pick-up member on its forward end, means for laterally feeding said extensible trough and pick-up member including a flexible feeding member, guide means disposed beneath and adjacent opposite sides of said extensible trough for guiding said flexible feeding member laterally from opposite sides thereof, to permit said flexible feeding member to be held from movement with respect to the ground adjacent its opposite ends, a wheel disposed intermediate said guide means and having engagement with said flexible feeding member for moving said extensible trough laterally along said flexible feeding member, a tension idler disposed on each side of said wheel and engaging the bights of said flexible feeding member on opposite sides of said wheel, and means for yieldably urging said tension idlers in directions to maintain tension on the slack side of said flexible feeding member and to compensate for angular movement of said extensible trough with respect to said flexible feeding member.

4. In a shaker conveyor, an extensible trough having a pick-up member on its forward end, means for laterally feeding said extensible trough and pick-up member including a flexible feeding member, guide sheaves disposed beneath and adjacent opposite sides of said extensible trough for guiding said flexible feeding member laterally from opposite sides thereof, to permit said flexible feeding member to be secured to the ground adjacent its opposite ends, a drive wheel disposed intermediate said sheaves and having engagement with said flexible feeding member for moving said extensible trough laterally along said flexible feeding member, a tension idler disposed on each side of said drive wheel and engaging the bights of said flexible feeding member on opposite sides of said drive wheel, means for guiding said tension idlers for movement towards and from said drive wheel and guide sheaves, and tension springs for urging said tension idlers in directions to maintain tension on the slack side of said flexible feeding member and compensate for angular movement of said extensible trough with respect to said flexible feeding member.

5. In a device for laterally moving the extensible trough of a shaker conveyor about a swivel in a conveyor trough line, a frame having connection with said swivel at its rear end and extending along and having engagement with opposite sides of said extensible trough, two guide sprockets mounted at opposite sides of said frame adjacent the forward end thereof, a reversibly driven drive sprocket disposed between said guide sprockets adjacent the forward end of said frame, a flexible chain adapted to be secured to fixed abutments at its ends and mesh with said drive sprocket and extend laterally from said guide sprockets, two laterally spaced tension idlers spaced rearwardly of said guide sprockets beneath said extensible trough on opposite sides of said drive sprocket and guided in said frame for movement longitudinally thereof, the bights of said chain between said drive sprocket and said guide sprockets being trained around said tension idlers, and separate yieldable means connected with each of said tension idlers for independently urging said idlers in directions to compensate for differences in length of said chain caused by angular movement of said frame and extensible trough with respect to said chain.

6. In a device for laterally moving the extensible trough of a shaker conveyor about a swivel in a conveyor trough line, a frame having connection with said swivel at its rear end and extending along and having engagement with opposite sides of said extensible trough, two guide sprockets mounted at opposite sides of said extensible trough, two guide sprockets mounted at opposite sides of said frame adjacent the forward end thereof, a reversibly driven drive sprocket disposed between said guide sprockets adjacent the forward end of said frame, a flexible chain adapted to be secured to fixed abutments at its ends and mesh with said drive sprocket and extend laterally from said guide sprockets, two tension idlers disposed rearwardly of said drive sprocket and having engagement with the bights of said chain between opposite sides of said drive sprocket and said guide sprockets, longitudinal guides on said frame for guiding said tension idlers for movement along said frame towards and from said drive sprocket, and a separate tension spring having connection with each of said tension idlers for independently urging said tension idlers in directions to compensate for differences in length of said chain caused by angular movement of said extensible trough with respect to said chain.

7. In a device for laterally moving the extensible trough of a shaker conveyor about a swivel in a conveyor trough line, a frame having connection with said swivel at its rear end and extending along and having engagement with opposite sides of said extensible trough, two guide sprockets mounted at opposite sides of said frame adjacent the forward end thereof, a drive sprocket disposed between said guide sprockets, a flexible chain adapted to be secured to fixed abutments at its ends and mesh with said drive sprocket and extend laterally from said guide sprockets, two laterally spaced tension idlers spaced rearwardly of said guide sprockets on opposite sides of said drive sprocket, means for guiding said tension idlers for movement along said frame towards and from said drive sprocket, the bights of said chain between said drive sprocket and said guide sprocket being trained around said tension idlers, a motor mounted on said frame beneath said extensible trough, a drive connection from said motor to said sprocket, and a yieldable member connected with each of said tension idlers for independently urging said idlers in directions to maintain tension on the slack side of said chain and to compensate for differences in length of said chain caused by angular movement of said frame and extensible trough with respect to said chain.

8. In a device for laterally moving the extensible trough of a shaker conveyor about a swivel in a conveyor trough line, a frame having connection with said swivel at its rear end and extending along and having engagement with opposite sides of said extensible trough, two guide sprockets mounted at opposite sides of said frame adjacent the forward end thereof, a drive sprocket disposed between said guide sprockets adjacent the forward end of said frame, a flexible chain adapted to be secured to fixed abutments at its ends and mesh with said drive sprocket and extend laterally from said guide sprockets, two tension idlers disposed rearwardly of said drive sprocket and having engagement with the bights of said chain between said guide sprockets and opposite sides of said drive sprocket, longitudinal guides in said frame for guiding said tension idlers for movement along said frame, a reversible motor mounted on said frame beneath said extensible trough, a self-locking drive connection from said motor to said drive sprocket, for driving said sprocket in reverse directions and for holding said sprocket from rotation, and a separate tension spring connected with each of said tension idlers for independently urging said tension idlers in directions to maintain tension on the slack side of said chain and to compensate for differences in length of said chain caused by angular movement of said extensible trough with respect to said chain.

LOY D. HAGENBOOK.